Nov. 17, 1925.
A. D. HEALY
1,561,466
CULTIVATOR AND WEEDER
Filed March 6, 1923
2 Sheets-Sheet 1
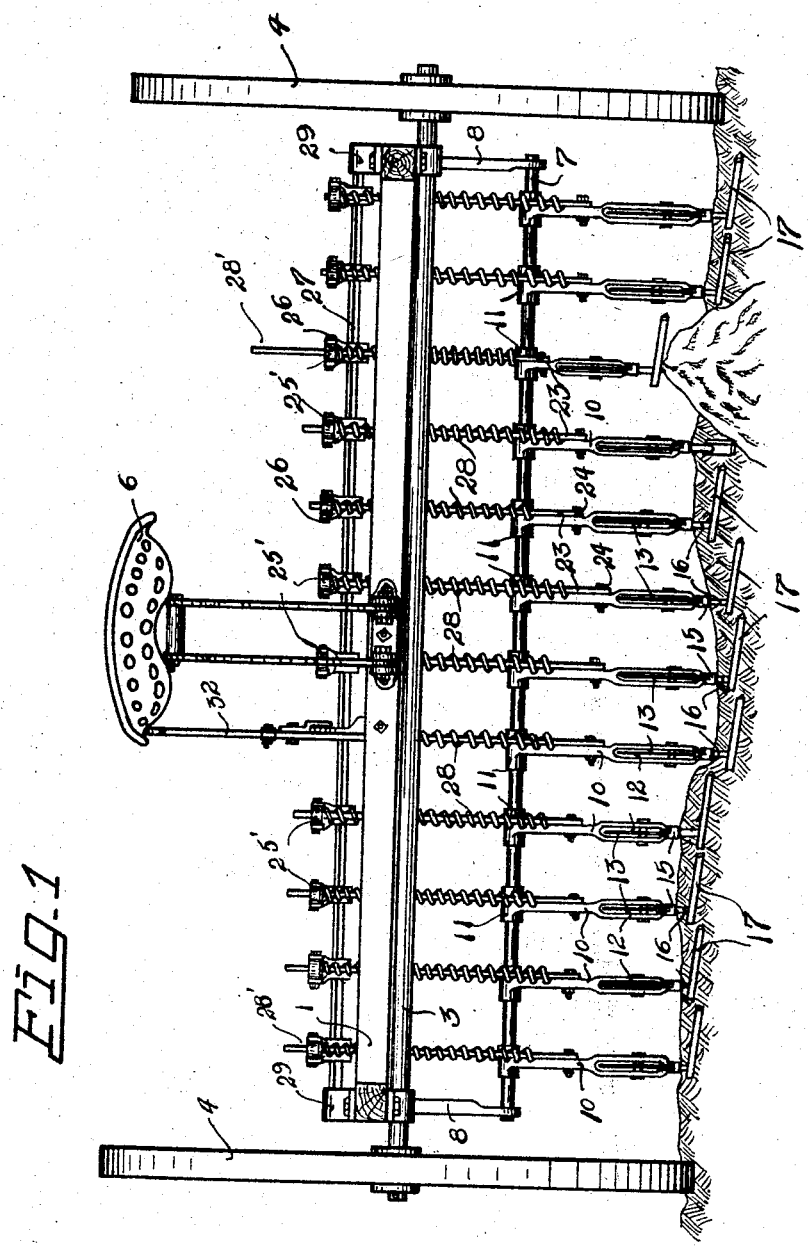
Inventor
Albert D. Healy
By Herbert E. Smith
Attorney

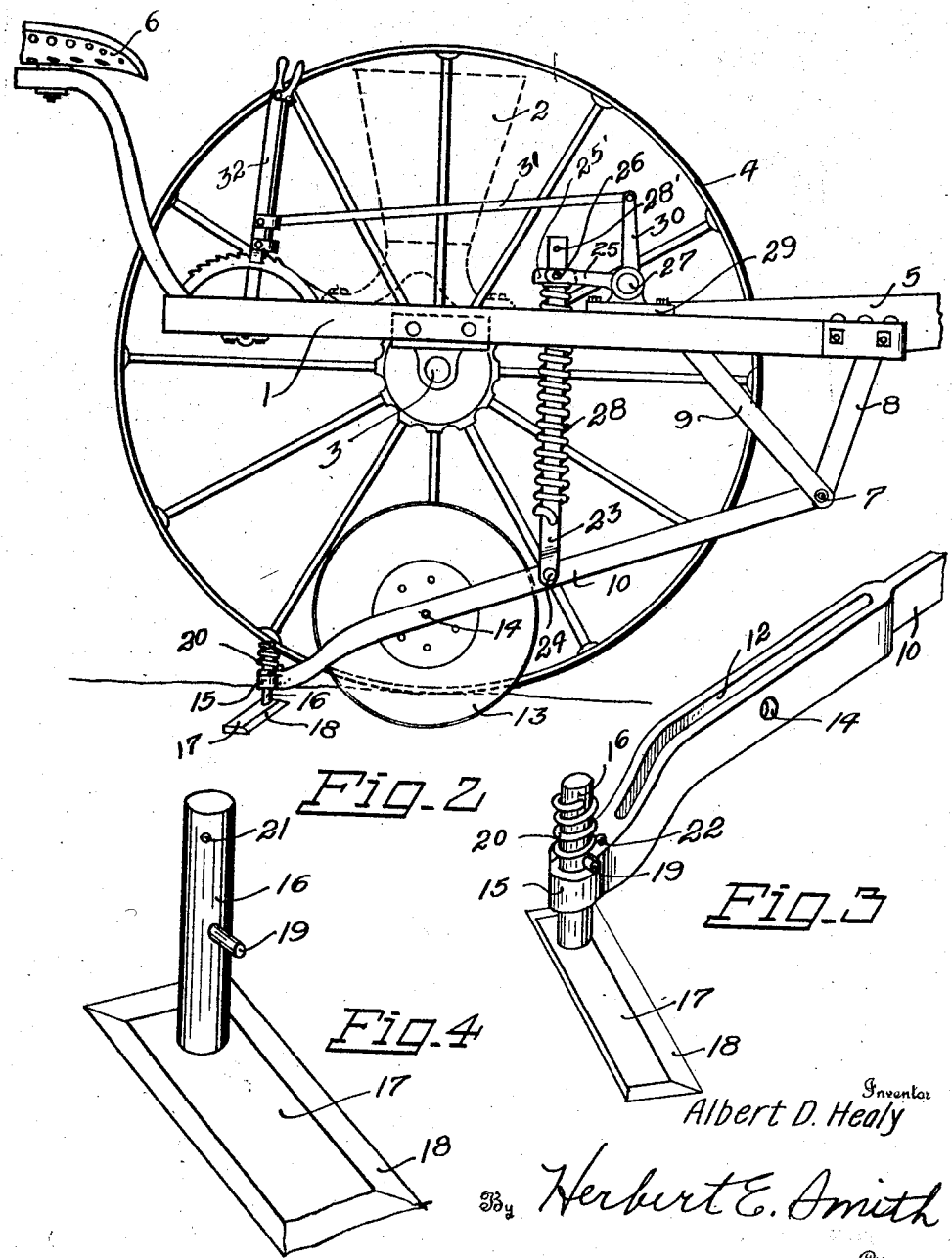

Patented Nov. 17, 1925.

1,561,466

UNITED STATES PATENT OFFICE.

ALBERT D. HEALY, OF DAVENPORT, WASHINGTON.

CULTIVATOR AND WEEDER.

Application filed March 6, 1923. Serial No. 623,287.

*To all whom it may concern:*

Be it known that I, ALBERT D. HEALY, a citizen of the United States, residing at Davenport, in Lincoln County, and State of Washington, have invented certain new and useful Improvements in Cultivators and Weeders, of which the following is a specification.

My present invention relates to improvements in cultivators and weeders of the wheeled type, utilizing rotary cultivator disks and weeding cutters, in connection with specially built implements, or with standard makes of seeders that are readily convertible for this purpose.

The primary object of my invention is the provision, in combination with the rotary disk cultivators, of weed cutting members arranged in a horizontal row and adapted to travel beneath the surface of the soil and follow the contour of the ground, to insure cultivation of the soil and destruction of growing weeds. The cultivating disks and weed cutters are adapted to follow the contour of the ground regardless of irregularities, as for instance depressions or elevations in the field to be cultivated and weeded. Spring actuated means are provided whereby the cultivating disks and weed cutters are automatically held and maintained in operative position with relation to the surface of the field and below the surface thereof, and manually operated means are provided for adjusting the position of the disks and cutters with relation to the surface of the field.

In the accompanying drawings I have illustrated one complete example of the physical embodiment of my invention wherein the parts are combined and arranged according to one mode I have devised for the practical application of the principles of my invention. The invention consists in the novel combinations and arrangements of parts as illustrated and as hereinafter more fully pointed out and claimed.

Figure 1 is a rear view of an implement embodying my invention wherein the series of cultivating disks and weed cutters are illustrated in several different positions relative to the surface of the field under cultivation.

Figure 2 is a side elevation of the implement as seen from the left in Figure 1 with the near wheel removed for convenience of illustration.

Figure 3 is a detail, perspective view, enlarged of one of the series of weed cutters, illustrating its relation to a beam.

Figure 4 is a perspective view of one of the weed cutters detached.

The supporting structure of the implement includes the usual type of metallic frame 1, which, as indicated in Figure 2 where a seed box 2 is shown in dotted lines, may be a converted seeder or planting implement, or the supporting structure may be specially built for the purpose. In either event the transverse axle 3 supports the frame through the pair of wheels 4, and draft power is applied to the usual tongue 5. The operator occupies the seat 6 and is in position to control and regulate the movable, operating parts of the implement, as will be described.

Slightly forward of the wheels and below the frame and axle a suspending bar 7 is supported in hangers or brackets 8 and 9, which are affixed to and depend below the frame, at each side thereof. This bar is designed to support by suspension at one end, a series of longitudinally disposed beams 10, and each of the beams is fashioned with a suspension or pivot sleeve 11 journaled loosely on the bar in order that the beam may swing in a vertical plane with the bar as a center. In normal position for work, these beams decline to the rear of the machine, and near their rear ends each beam is fashioned with a slot 12, disposed in a vertical plane and adapted to receive a circular disk 13. These disks may be of the usual type employed in cultivators and they are journaled in the beams with bearings 14 approximately in the same vertical plane as the axle of the implement, with the lower portion of each disk designed to penetrate beneath the surface of the soil as indicated by dotted lines in Figure 2.

At the rear, free end, of each beam a bearing sleeve 15 is provided, which is adapted to receive the swivel pin 16 of a cutter blade 17. The pin stands erect in approximately vertical position, and the blade 17 which is disposed at an angle to the pin, rides through the soil just beneath its surface, in an approximately horizontal position. The forward edge and one end of the blade is beveled as at 18 to form a cutting edge or knife edge for cutting off weeds beneath the surface of the soil as the implement is dragged forward, and the swivel pin is provided with a transverse cotter pin 19 just above the sleeve 15 for retaining the blade in position.

The blade is adapted to turn, for avoiding obstructions, with its swivel pin as a center and supported in the sleeve 15, but the blade is normally held in position, transversely of the implement by means of a spring 20 coiled about the swivel pin above the bearing sleeve with its upper end anchored or secured in an aperture 21 in the swivel pin, and its lower end secured as at 22 in a complementary hole in the upper face of the beam adjacent to the sleeve 15. The spring is coiled in such manner as to swing the blade to the position in Figure 2 and hold it there when the implement is working, and in the event that the blade encounters a rock or other obstruction and is swung by the motion of the implement to position that will permit passage of the blade around the obstruction, the spring automatically restores the blade to operative position after the obstruction is passed.

Each beam is equipped with a vertically disposed connecting rod 23 pivotally attached to the beam at 24, and at its upper end the rod is connected to a rock arm 25 which carries a slide collar 25'. The free end of the rock arm is forked or bifurcated and has bearings for the trunnions 26 on the slide collar in order that the arm may rock with the shaft 27 to which it is affixed, and yet maintain the proper connection between the slide collar and the connecting rod. A spring 28 is coiled about the connecting rod and secured thereto at its lower end above the pivot connection 24, while the upper end of the spring has a bearing against the under side of the slide collar 25' on the connecting rod. A lift pin 28' is fixed transversely in the connecting rod above the slide collar to limit downward movement of the rod in the collar and to afford means for lifting the rod and beam when the rock arm and its shaft are turned. Thus it will be apparent that each beam with its disk and blade is independently movable in a vertical plane, as indicated in Figure 1 where one of the blades is illustrated as riding over an elevation in the surface of the soil. As the disk rides over the elevation the beam is swung on its pivot 7, lifting the connecting rod against tension of the spring 28 and the rod is pushed upwardly through the stationary slide collar of the rock arm. After the disk and blade have passed down from the elevation the spring expands to force the beam and operating parts to normal working position.

The rock shaft 27 is journaled in bearings 29 on the main frame, and the shaft may be rocked through the connections including a lever arm 30 fixed to the shaft, a lever link 31 and the lever 32 to which the link is pivoted. The operating lever is located in position for ready access of the operator sitting in the seat 6, and by pulling the lever 32 toward him the operator may turn the rock shaft and force all of the beams, through the instrumentality of the springs 28 on the connecting rods and the collar and rock arms, downwardly to adjust the position of the disks and cutter blades with respect to the surface of the soil. By shoving the lever 32 to the right in Figure 2 all of the beams may be swung upwardly on their suspending bar to elevate the disks and blades above the surface of the soil for transportation purposes.

It will be obvious that the vertically disposed disks, traveling through the soil will cut and break the soil, and the cutter blades following the disks will cut weeds and thus mulch the soil, severing the weeds beneath the soil and thus preventing future growth. The soil may be kept fallow and ready for planting by the utilization of the implement and as the rows of disks and cutter blades, which extend transversely of the implement, are of considerable length, it will be apparent that the field may be cultivated and worked in a comparatively short time.

Having thus fully described my invention, what I claim as new and desire to secure by Letters Patent is:—

1. The combination in a wheeled cultivator, with a pivoted, slotted beam, and a vertically arranged cutting disk journaled in said beam, of a horizontally disposed cutter blade, means for swiveling said blade with relation to the beam, means for holding said blade in normal operative position, and resilient means for depressing said beam.

2. The combination in a wheeled cultivator with a pivoted slotted beam and manually operated means for elevating said beam to inoperative position, and a vertically arranged cutting disk journaled in said beam, of a horizontally disposed cutter blade, means for swiveling said blade on said beam, resilient means for holding said blade in normal operative position, and resilient means in connection with said manually operated means for depressing said beam.

3. The combination with a supporting frame and rock shaft and operating means therefor, of a beam pivoted on said frame, a vertically disposed disk journaled in said beam and a horizontally disposed cutter blade swiveled in said beam, means for holding said blade in operative position, a rock arm on said shaft and a collar pivoted in said arm, a connecting rod pivoted to said beam and engaging said collar, and a spring beneath the collar and attached to said rod.

In testimony whereof I affix my signature.

ALBERT D. HEALY.